United States Patent [19]

Zauner

[11] Patent Number: 5,613,289
[45] Date of Patent: Mar. 25, 1997

[54] PROCESS OF ASSEMBLING A SYNCHRONIZER FOR A GEAR CHANGE BOX

[75] Inventor: Josef Zauner, Pettenbach, Austria

[73] Assignee: MIBA Sintermetall Aktiengesellschaft, Laakirchen, Austria

[21] Appl. No.: 509,865

[22] Filed: Aug. 1, 1995

[30] Foreign Application Priority Data

Sep. 21, 1994 [AT] Austria ........................... 1787/94

[51] Int. Cl.$^6$ ........................... B23P 11/02; B23Q 17/00
[52] U.S. Cl. ........................... 29/407.08; 29/447
[58] Field of Search ........................... 29/407.1, 407.09, 29/407.01, 447, 515, 407.05, 407.08; 192/53.33, 53.31, 53.34, 53.364, 53.332, 53.342, 53.343; 74/339

[56] References Cited

U.S. PATENT DOCUMENTS

| | | | |
|---|---|---|---|
| 4,612,825 | 9/1986 | Engle | 29/434 X |
| 4,620,623 | 11/1986 | Ikemoto et al. | 74/339 |
| 4,869,353 | 9/1989 | Ohtsuki et al. | 192/53.31 |
| 5,531,305 | 7/1996 | Roberts et al. | 192/53.332 |

FOREIGN PATENT DOCUMENTS 389324  9/1990  European Pat. Off. .

*Primary Examiner*—Timothy V. Eley
*Attorney, Agent, or Firm*—Collard & Roe

[57] ABSTRACT

A process is described which serves to assemble a synchronizer for a gear change box, which synchronizer comprises a hub provided with a slidable sleeve and at least one cone coupling comprising a double-conical ring, which is freely rotatable relative to the hub and is adapted to be non-positively gripped between an inner friction ring, which is connected to the hub, and a synchronizing outer ring, which is axially displaceable relative to the friction ring by the slidable sleeve, wherein the clutch in an engaged position is moved to engage the synchronizing outer ring with a locating abutment to ensure an axial lost motion between the synchronizing ring and the hub, and the friction ring is subsequently axially fixed to the hub and thereafter the locating abutment is removed. To permit an exact adjustment of the axial lost motion, it is proposed that a predetermined axial force is exerted on the inner friction ring, when it is held to be axially displaceable on the hub substantially without friction, and when the cone clutch is in an engaged state the synchronizing ring is moved by said axial force exerted on said friction ring into engagement with said locating abutment to locate the inner friction ring on the hub in a fixed axial position, whereafter the inner friction ring is axially fixed to the hub in that axial position.

3 Claims, 3 Drawing Sheets

PROCESS OF ASSEMBLING A SYNCHRONIZER FOR A GEAR CHANGE BOX

BACKGROUND OF THE INVENTION

1. Field of the Invention

This invention relates to a process of assembling a synchronizer for a gear change box, which synchronizer comprises a hub provided with a slidable sleeve and at least one cone coupling comprising a double-conical ring, which is freely rotatable relative to the hub and is adapted to be non-positively gripped between an inner friction ring, which is axially displaceable relative to the friction ring by the slidable sleeve, wherein the clutch in an engaged position is moved to engage the synchronizing outer ring with a locating abutment to ensure an axial loss motion between the synchronizing ring and the hub, the friction ring is subsequently axially fixed to the hub and thereafter the locating abutment is removed.

2. Description of the Prior Art

In gear change boxes comprising a hub, which is non-rotatably mounted on a shaft, and a gear, which is freely rotatably mounted on the shaft, it is desired to reliably connect the hub to the gear by a claw clutch, which comprises a slidable sleeve, which is axially movable on the hub and adapted to be slidably fitted on an annular set of claws provided on the gear. For that purpose the gear must rotate at the same speed as the hub. This is achieved by the provision of a cone clutch, which is provided between the hub and the gear and comprises a double-conical ring, which is adapted to rotate the gear and to be non-positively gripped between an inner friction ring, which is non-rotatably connected to the hub, and a synchronizing ring, which is axially movable relative to said friction ring by the slidable sleeve. An axial displacement of the slidable sleeve on the hub in a clutch-engaging sense will be transmitted to the synchronizing ring so that the double-conical ring disposed between the inner friction ring and the synchronizing outer ring is frictionally gripped so that the gear, which is non-rotatably connected to the synchronizing ring, is accelerated to the speed of the hub and the coupling engagement between the slidable sleeve and the annular set of claws on the gear can then freely be effected. The lost motion involved in the actuation of the cone clutch by the slidable sleeve will be minimized if the axial clearance required for the overrunning of the double-conical ring is minimized. For that purpose it is known (European Patent 0 389 324) to define that axial clearance in that the synchronizing outer ring is axially moved into engagement with a locating abutment, which is fixed to the hub. When the synchronizing ring and the inner friction ring engage the double-conical ring without a backlash, it will then be possible to locate the inner friction ring on the hub in an axial position which provides for the lost motion which is defined by that locating abutment when the synchronizing ring engages that abutment and it will then be possible to connect the inner friction ring to the hub, for example, by welding or frictional engagement. It will be understood that the locating abutment for the synchronizing ring must be removed before the cone clutch can be actuated. But even with said assembling aids it has not been possible to comply with more stringent requirements for sufficiently close tolerances for the axial lost motion of the cone clutch so that it has not been possible to achieve a satisfactory limitation of the axial lost motion.

SUMMARY OF THE INVENTION

It is an object of the invention to provide for assembling a synchronizer for a gear change box a process which is of the kind described first hereinbefore and is designed to minimize the lost motion which is involved in the actuation of the cone clutch of the synchronizer by the slidable sleeve.

That object is accomplished in accordance with the invention in that a predetermined axial force is exerted on the inner friction ring when it is held to be axially displaceable on the hub substantially without friction, and when the cone clutch is in an engaged state the synchronizing ring is moved by said axial force exerted on said friction ring into engagement with said locating abutment to locate the inner friction ring on the hub in a fixed axial position, whereafter the inner friction ring is axially fixed to the hub in that axial position.

The invention is based on the recognition that in the operation by which the inner friction ring is axially fixed to the hub the axial friction forces involved in the assembling of the synchronizer and the elastic bending of the several elements of the cone clutch in the axial direction may have a considerable influence on the axial lost motion which will subsequently be allowed for the cone clutch and for this reason said facts must not be disregarded. For this reason the cone clutch is urged by a predetermined axial biasing force against the locating abutment fixed to the hub and because the inner friction ring is displaceable on the hub substantially without friction it is ensured that the biasing force exerted on the cone clutch is actually determined only by the axial force which is exerted rather than by axial friction forces acting between the inner friction ring and the hub, as would be the case if the inner friction ring were press-fitted on the hub. A displacement substantially without friction can be ensured in a simple manner in that the inner friction ring is a sliding fit on the hub.

According to a further feature of the invention the assembling can be facilitated in that the axial force is exerted on the inner friction ring by means of a locating ring, which is fitted in a hot state on the hub with a radial clearance and while the exertion of the axial force is continued is cooled to effect a shrunk-on fit. Because the axial force is exerted on the inner friction ring by means of a locating ring, the inner friction ring need not be fixed directly to the hub. Besides, a very precise positioning is effected and because the exertion of the axial force is not discontinued as the locating ring is joined to the hub but it is merely necessary to wait until the hot locating ring has sufficiently cooled to establish a desired shrunk-on fit. The joint can subsequently be strengthened by welding.

Because the cone clutch is subjected to a biasing force during the assembling of the synchronizer, the completed assembly can be tested in a simple manner. This can be effected in that after the axial positioning of the inner friction ring on the hub and before the removal of the locating abutment the exertion of the external axial force is discontinued, the synchronizing ring is rotated and the torque is determined which is required for that rotation. That torque will then be a measure of the axial biasing force which is exerted on the cone clutch and permits an evaluation of the lost motion which has been adjusted.

DETAILED DESCRIPTION OF THE PREFERRED EMBODIMENT

Figure 1:
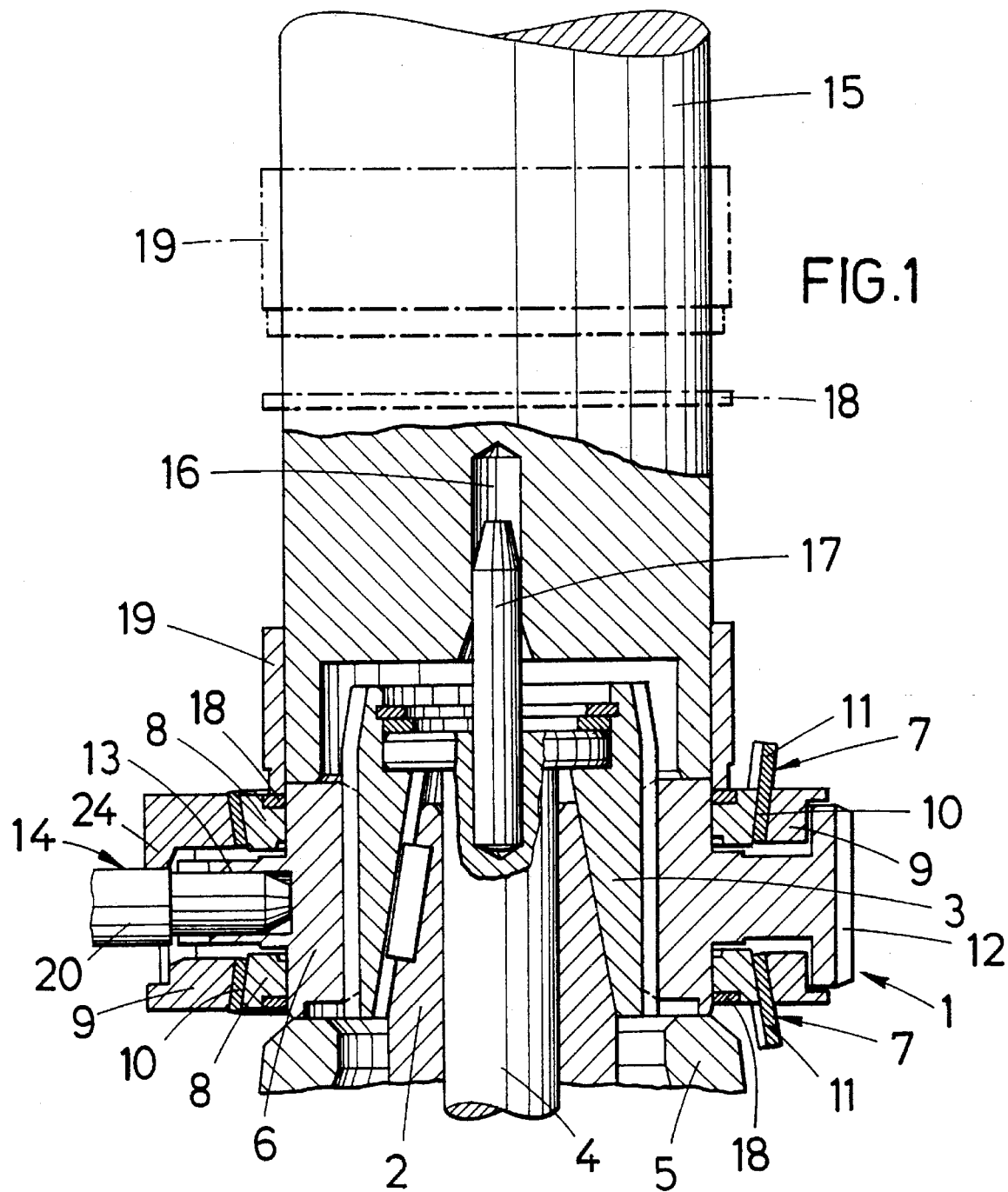
FIG. 1 is a simplified axial sectional view showing a device for use in assembling a synchronizer by the process in accordance with the invention.

The process in accordance with the invention for assembling a synchronizer for a gear change box will now be explained more in detail with reference to the drawing.

Figure 3:
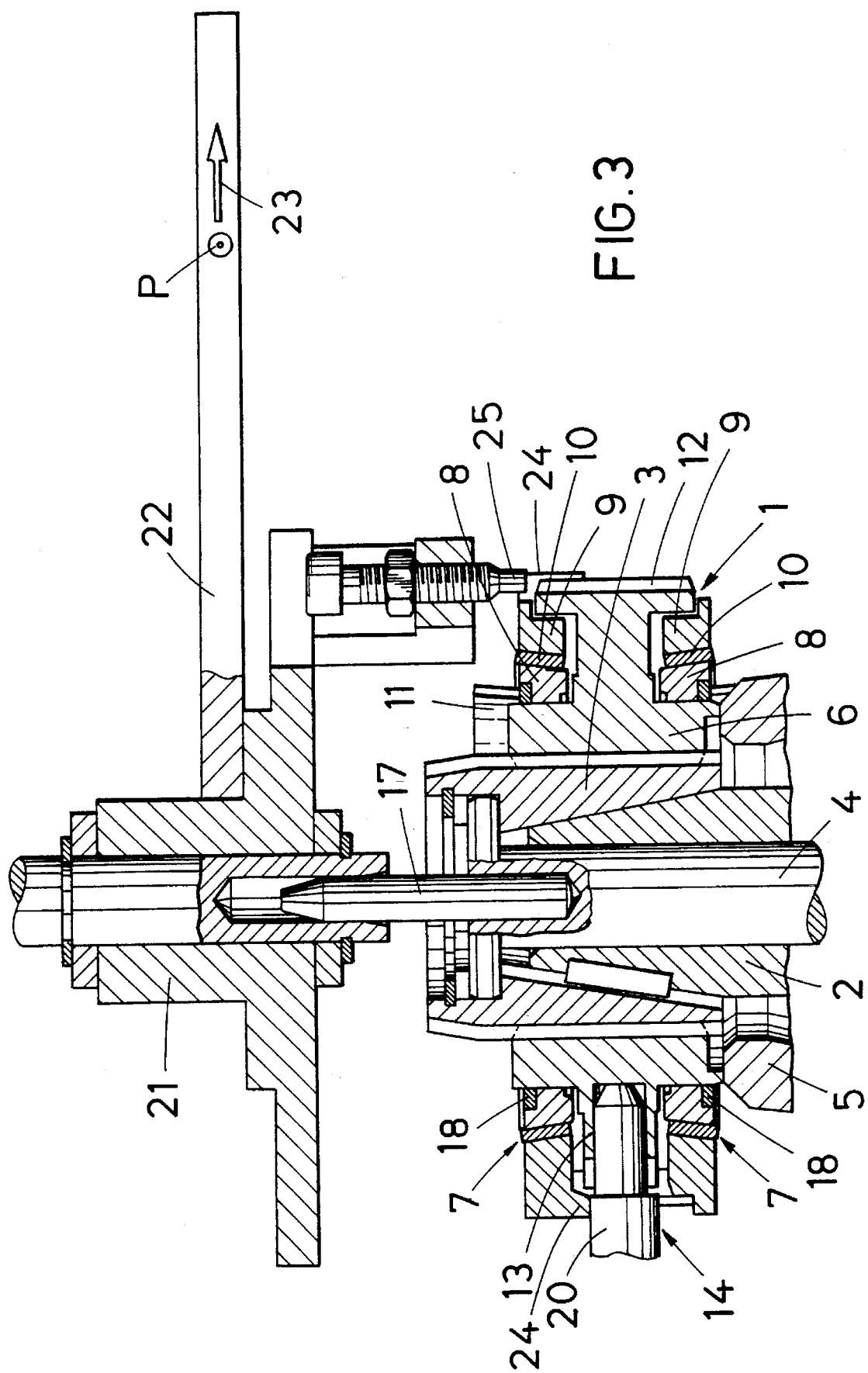
FIG. 3 is an axial sectional view taken on line III—III in FIG. 2 and shows the device together with a testing head for testing the completed assembly.

As is apparent from FIGS. 1 and 3 the device for use in assembling a synchronizer 1 comprises a biasing sleeve 3, which cooperates with a hollow conical mandrel 2 and can axially be displaced on the mandrel 2 by means of a piston rod 4, which extends through the mandrel 2. The hub 6 of the synchronizer 1 is provided on its inside surface with teeth for meshing with teeth on the outside surface of the biasing sleeve 3 so that the hub 6 fitted on the biasing sleeve 3 can be displaced into engagement with an annular abutment 5. In this manner the hub 6 can be centered on the mandrel 2 and biased for the further assembling operations by the biasing sleeve 3.

The synchronizer 1 comprises two cone clutches 7, which are disposed on opposite sides of the hub 6 and each of which comprises an inner friction ring 8, a synchronizing outer ring 9, and a double-conical ring 10, which is disposed between the friction ring 8 and the synchronizing ring 9. The inner friction ring 8 and the synchronizing outer ring 9 are associated with the hub 6. The double-conical ring 10 comprises axially protruding coupling elements 11 for engaging a gear of a gear change box. That gear can be coupled to the hub 6 by a claw clutch, which comprises a slidable sleeve, which is axially slidable on the hub 6, and an annular set of claws, which are provided on the gear and adapted to fit the slidable sleeve. The slidable sleeve is usually actuated by means of a shift fork and is movably mounted on an annular set of claws 12, which are formed on the hub 6. By means of a spring catch the slidable sleeve can axially be fixed relative to said annular set of claws 12. For that purpose, spring-loaded ball catches may be movably mounted in radial bores 13, which are distributed around the periphery of the annular set of claws 6. Said ball catches may be arranged to cooperate with mating countercatches of the slidable sleeve. To permit a satisfactory slidable fitting of the slidable sleeve on the annular set of claws of that gear of the gear change box which is to be driven at a given time, it must be ensured that the slidable sleeve and the gear to be driven will rotate at the same speed. For this purpose the gear is driven by means of the associated cone clutch 7 when its slidable sleeve has axially been displaced into engagement with the synchronizing ring to rotate the latter. As a result, the double-conical ring 10 is frictionally gripped between the inner friction ring 8, which rotates in unison with the hub 6, and the synchronizing ring 9 and the double conical ring 10 is thus accelerated to the speed of the hub 6. For that purpose the inner friction ring a must be fixed to the hub 6 in such an axial position that only a closely limited axial lost motion of, e.g., 0.1 mm, is permitted for the synchronizing ring 9.

To ensure such a limitation of the axial lost motion of the cone clutch 7 as the synchronizer 1 is assembled, a locating abutment for defining that lost motion is fixed to the hub 6 and the synchronizing ring 9 of the cone clutch 7 is urged against the abutment 14 by exerting an axial force on the inner friction ring 8. Owing to said axial force, the cone clutch is subjected to a biasing force which will eliminate all lost motions so that the axial position of the inner friction ring 8 on the hub 6 can be determined with high accuracy with respect to a desired axial lost motion of the synchronizing ring 9, provided that care is taken to permit a displacement of the friction ring 8 on the hub 6 substantially without friction so that the axial load on the cone clutch will depend only on the axial force which is exerted.

In the use of the apparatus shown in FIG. 1, the axial force is exerted in that a mounting head 15 is initially mounted on the top end face of the hub 6, which rests on the abutment 5, and the assembling head 15 is aligned with the mandrel 2 by means of a centering pin 17, which is inserted into a centering bore 16. That assembling head 15 carries a locating ring 18, which has been heated so that it can be slidably fitted on the hub 6 with a radial clearance but is adapted to be cooled to establish an interference fit on the hub. A pressure-applying sleeve 19 is displaceably mounted on the mounting head 15 and is operable to displace the locating ring 18 along the mounting head 15 until the locating ring 18 is slidably fitted on the hub 6 and is urged by an adjustable axial force against the inner friction ring 8 of the cone clutch 7. As a result, the synchronizing outer ring 9 will be forced against the locating abutment 14 and a predetermined biasing force will be exerted on the cone clutch. In the embodiment shown, the locating abutment 14 comprises stop pins 20, which are inserted into the bores 13 intended to receive the ball catches. But different abutments may obviously be provided.

Figure 2:
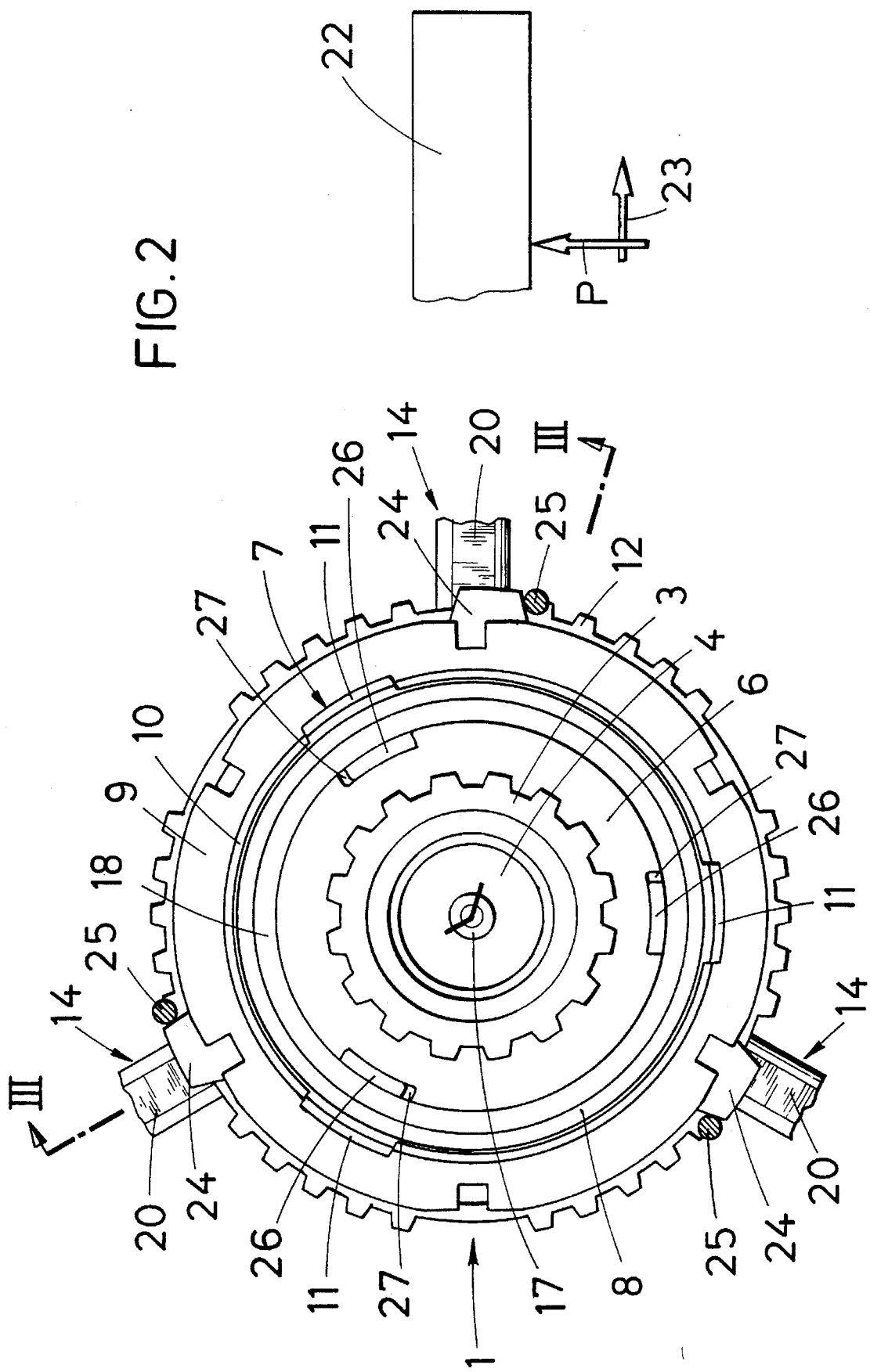
FIG. 2 is a top plan view showing a synchronizer disposed in a device for use in assembling.

The inner friction ring 8 can be positioned on the hub 6 exactly in a predetermined axial position in that the locating ring 18 held on the hub 6 is not relieved from the axial force exerted on the locating ring 18 by means of the pressure-applying sleeve 19 until the locating ring 18 has been cooled sufficiently to be a shrunk-on fit on the hub 6. The axial lost motion which has been adjusted can be tested in that the mounting head 15 is removed and a testing head 21 is mounted and is used to exert on the synchronizing outer ring 9 a torque, which is progressively increased until it is sufficient to rotate the synchronizing ring 9 relative to the hub 6. This test is carried out while the locating abutment 14 is still fixed to the hub 6. The torque which is required to rotate the synchronizing ring 9 is a measure of the axial preload on the cone clutch and that torque can be used to check the adjusted axial lost motion. The torque is exerted on the testing head 21 by means of an arm 22, on which a constant force P is exerted at a point which is radially spaced from the testing head 21 by a distance which is increased to increase the torque which required. This is indicated in FIGS. 2 and 3 by the arrow 23. The torque is transmitted to the synchronizing ring 9 by means of coupling fingers 25, which engage coupling projections 24. When the rotation of the synchronizing ring 9 has been initiated, the radial distance of the point to which the force P is applied from the testing head 21 may be determined as a measure of the torque which is being exerted and of the axial lost motion to which the cone clutch 7 has been adjusted.

It is apparent from FIG. 2 that the rotation of the hub 6 is imparted to the inner friction ring 8 by radially inwardly protruding projections 26 which are provided on the friction ring 8 and extend with a circumferential play into corresponding axial grooves 27 of the hub. Because the locating ring 18 rather than the friction ring 8 is non-displaceably fixed to the hub 6, the friction ring 8 can be rotated on the hub 6 to the extent determined by the clearance between the projections 26 of the friction ring and the grooves 27 of the hub. Because that rotation can be used for a test of the axial lost motion to which the clutch has been adjusted, the rotation of the synchronizing ring 9 by means of the testing head 21 does not involve a rotation of the elements of the cone clutch 7 relative to each other.

I claim:

1. In a process of assembling a synchronizer for a gear change box, which synchronizer comprises a hub, a slidable sleeve axially slidably mounted on said hub, and at least one cone clutch, which cone clutch comprises an inner friction ring, which is axially coupled to said hub, a synchronizing outer ring, which is axially displaceable relative to said friction ring by means of said slidable sleeve to engage and disengage said clutch, and a double conical ring, which is freely rotatable relative to said hub and is disposed between said friction and synchronizing rings and is arranged to be frictionally gripped between said rings when said clutch is in an engaged state, wherein a locating abutment is axially fixed to said hub, said cone clutch in an engaged state is axially moved relative to said hub to a position in which said synchronizing ring engages said locating abutment to define for said friction ring a position in which said cone clutch provides for a predetermined axial lost motion between said synchronizing ring and said friction ring, said friction ring is subsequently axially located on said hub while said clutch is still engaged and said synchronizing ring engages said locating abutment, and said locating abutment is subsequently removed from said hub, the improvement comprising the steps of holding said friction ring on said hub so that said friction ring is axially displaceable on said hub substantially without friction before said cone clutch in an engaged state is axially moved relative to said hub to said position in which said synchronizing ring engages aid locating abutment, subsequently causing said synchronizing ring to engage said locating abutment by exerting a predetermined axial force on said friction ring thus held on said hub, whereby a predetermined axial position on said hub is determined for said friction ring, and subsequently locating said friction ring on said hub in said predetermined axial position to provide for a predetermined axial lost motion between said friction ring and said synchronizing ring of said cone clutch.

2. The improvement set forth in claim 1, comprising the steps of fitting a locating ring in a warm state on said hub with a radial clearance, exerting said axial force on said friction ring by means of said locating ring while it is still warm to define said radial clearance, and cooling said locating ring to establish a shrunk-on fit of said locating ring on said hub while the exertion of said axial force by said locating ring on said friction ring is continued.

3. The improvement set forth in claim 1, comprising the steps of discontinuing the exertion of said axial force on said friction ring after the said friction ring has been located on said hub in said predetermined axial position and while said locating abutment is still fixed to said hub, testing the cone clutch by determining a torque required to rotate said synchronizing ring on said hub.

* * * * *